(No Model.)

A. V. ABERCROMBIE & W. A. MACK.
POWER TRANSMITTER.

No. 508,075. Patented Nov. 7, 1893.

Witnesses
R. B. Moser.
Georgia Schaeffer

Inventors
Alexander V. Abercrombie
William A. Mack.
by H. J. Fisher,
Attorney

UNITED STATES PATENT OFFICE.

ALEXANDER V. ABERCROMBIE, OF BRIDGEPORT, CONNECTICUT, AND
WILLIAM A. MACK, OF CLEVELAND, OHIO.

POWER-TRANSMITTER.

SPECIFICATION forming part of Letters Patent No. 508,075, dated November 7, 1893.

Application filed March 6, 1893. Serial No. 464,914. (No model.)

*To all whom it may concern:*

Be it known that we, ALEXANDER V. ABERCROMBIE, residing at Bridgeport, in the county of Fairfield and State of Connecticut, and WILLIAM A. MACK, residing at Cleveland, in the county of Cuyahoga and State of Ohio, citizens of the United States, have invented certain new and useful Improvements in Power-Transmitters; and we do hereby declare that the following is a full, clear, and exact description of the invention, which will enable others skilled in the art to which it appertains to make and use the same.

Our invention appertains to power transmitters having a friction engagement, and the object of the invention is to provide a transmitter adapted to be operated or driven from a power shaft, and which, when thrown into engagement, is automatically held in such engagement until released, all substantially as shown and described and particularly pointed out in the claims.

Figure 1:
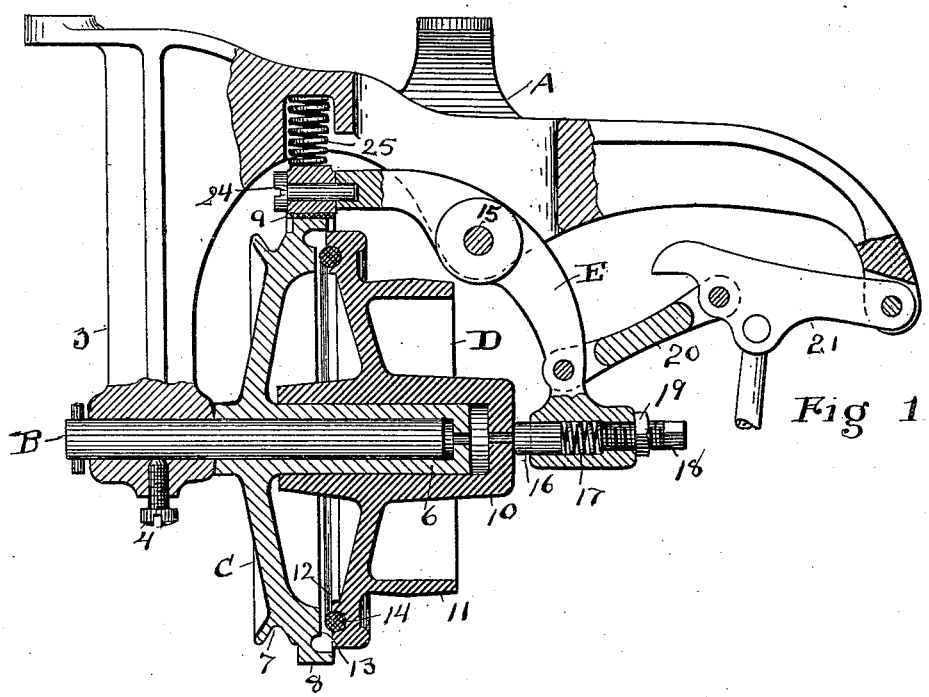
Figure 2:
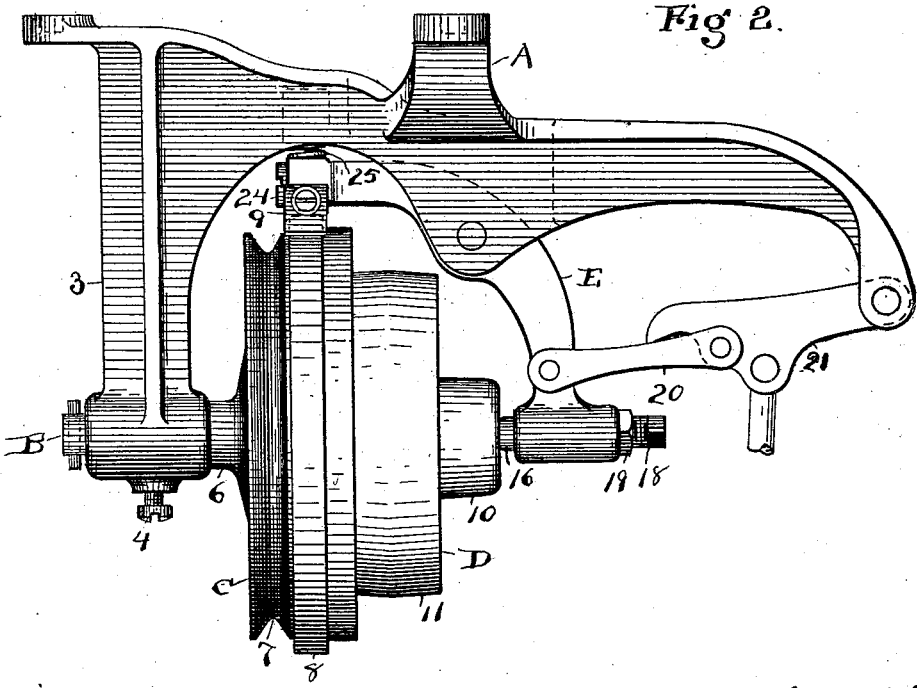

In the accompanying drawings, Figure 1 is a vertical central sectional elevation of our improved power transmitter, and Fig. 2 is a side elevation thereof looking in the same direction and the same point of view as in Fig. 1.

A represents a bracket, adapted to be secured to any suitable support or frame and to carry the transmitting mechanism. This bracket is here shown as having a downwardly extending arm 3, provided with a horizontal bearing and supporting a short shaft B rigidly therein. This shaft is fixed in its bearing, in this instance, by a set screw 4, whereby it is locked in position or may be released so as to be removed, and thereby also remove the friction wheels. Both the bracket arm 3 and the shaft are made strong enough to support the wheels C and D without other means of support. The wheel —C— has a long tubular hub sleeved upon the shaft —B— from its free end, and arranged to bear against the hanging arm —3—, which forms the back therefor when the band or drive wheel —D— is forced up into frictional engagement therewith. The wheel C turns freely on the shaft B, and the hub thereof preferably is closed at its inner end except a small orifice, as shown. This wheel furthermore has a circumferential groove or channel 7 for the usual belt or leather cord, or its equivalent, by which the machine is driven, and at the side of this groove a flat smooth bearing surface 8, to be engaged by the brake 9 through which the said wheel and the machine it drives are instantly stopped when the power is taken off. The friction or drive wheel D has a tubular hub 10, corresponding in outline to the hub 6 of the wheel C, and sleeved thereon as the said hub is on the shaft B. This wheel has the usual band surface 11, to which power is communicated from the line shaft or other source of power by band or belt in the usual way, and the said wheel is supposed to be continuously in motion during working hours. On the inner edge of the wheel is formed a flat face 12 opposite the friction surface 13 of the wheel C. This flat face has an annular groove adapted to hold a friction welt or roll 14, of leather, or other suitable material, laid and held in said groove. Contact between the two wheels occurs through this welt or roll working against the friction surface 13, so that the metal surfaces do not really touch one another. Now, in order that engagement between said wheels may be easily made, and that said engagement shall be automatically held when made, we employ, first, a lever or member E, pivoted between its ends at 15 on the bracket A, and curved to bring its lower end opposite the closed end of the hub 10, and the upper end over wheel C to support the brake for said wheel. In the lower end of the said lever is formed a socket or chamber, constructed to accommodate a bearing pin 16, and a spring 17 behind the same, a screw plug 18, having a lock nut 19, serving to take up the tension on said spring or to relieve the same, as may be desired. The pin 16 projects outward beyond the lever E, and alone bears against the hub 10, when engagement occurs. Then to actuate and lock said arm, we provide toggle links 20 and 21, pivoted, respectively, to the lever E and the bracket A. These links are so arranged that they spring upward when open and downward when closed, and a rod 22, running to the usual treadle, if a sewing machine be used, or to its equivalent in convenient reach of the hands or the feet of the operator if some other machine or mechanism be driven by the transmitter. It thus occurs that when the said links are closed and locked, the lever E through its immediate bearing point 16, presses against the hub of the drive wheel D and forces it into frictional engagement with the wheel C. This engagement is supposed to be so close and effective that the wheel C will be practically clutched and carried around with wheel D and enabled thereby to carry all the pull or load that comes upon it without slipping.

In order that the frictional engagement when effected may not be too abrupt or severe, and that the contact of the wheels may have a measure of relief, we have introduced the spring pressure mechanism described in the lever E. This mechanism is sufficient, ordinarily, to cause the requisite engagement to be made between the friction wheels, but also provides against strain or injury that may arise from close and unyielding contact. This construction also relieves the endwise pressure on the bearings, and accommodates itself to wear or abrasion upon said bearings. The screw plug 18 enables the pressure to be changed according as the conditions of the machine may demand. The upper end of lever E has the brake 9 affixed thereto by the screw 24, but the brake may form part of the lever, and in a socket or cavity in the bracket A is a spiral spring 25 which bears upon said brake and lever at all times, and which has sufficient strength to cause practically instant braking or stopping of the said wheel and the machine run thereby, as soon as the power is taken off. This speedy stopping of a machine, for example, a sewing machine, is of the utmost importance to the operator, as it saves much valuable time which would be lost if the machine were to run on some time after every stop that was made.

The exact details herein described need not of course be adhered to in all cases, and some of the parts may be materially modified or changed and yet remain within the spirit of the invention.

Having thus described our invention, what we claim is—

1. The power transmitting mechanism herein described consisting of a pair of wheels adapted to be brought into frictional contact, a pivoted lever, and toggle levers to press said pivoted lever against said wheels and cause their engagement, substantially as set forth.

2. The mechanism herein described comprising the drive wheel and the driven wheel adapted to be brought into frictional engagement, a pivoted lever to bear against one of said wheels and having a yielding bearing through which pressure upon the wheel is exerted, and toggle links to effect the pressure, substantially as set forth.

3. The construction herein described consisting of the shaft and the two wheels thereon, adapted to be brought into frictional engagement, the pivoted lever having a yielding bearing in its end bearing against one of said wheels, and means to increase or diminish the pressure of said bearing, in combination with a pair of toggle links pivoted respectively to said pivoted lever and to the supporting frame, substantially as set forth.

4. The combination of the bracket, the shaft rigid therewith and the friction wheels sleeved on the said shaft and one upon the other, the lever pivoted between its ends on said bracket and toggle mechanism connected with said lever near one end to press the lever toward said friction wheels and force them into contact, and a brake for one of said wheels on the other end of said lever, substantially as set forth.

Witness our hands to the foregoing specification this 30th day of January, 1893.

ALEXANDER V. ABERCROMBIE.
  WILLIAM A. MACK.

Witnesses for Abercrombie:
 WILLIAM H. COMLEY,
 WILLIAM H. COMLEY, Jr.
Witnesses for Mack:
 A. E. INGALLS,
 GEO. P. SMITH.